(12) United States Patent
Holt et al.

(10) Patent No.: US 11,221,036 B2
(45) Date of Patent: Jan. 11, 2022

(54) AXLE SUSPENSION SYSTEM HAVING A SHEAR BOLT

(71) Applicant: ArvinMeritor Technology, LLC, Troy, MI (US)

(72) Inventors: Craig Allen Holt, Chesterfield, MI (US); Luis Gustavo Schuck, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 441 days.

(21) Appl. No.: 16/427,800

(22) Filed: May 31, 2019

(65) Prior Publication Data

US 2020/0378429 A1 Dec. 3, 2020

(51) Int. Cl.
| | | |
|---|---|---|
| *F16B 31/02* | (2006.01) | |
| *B60G 9/02* | (2006.01) | |
| *F16B 35/04* | (2006.01) | |
| *F16B 41/00* | (2006.01) | |
| *B60G 7/02* | (2006.01) | |
| *B60G 9/00* | (2006.01) | |

(52) U.S. Cl.
CPC .............. *F16B 31/021* (2013.01); *B60G 9/02* (2013.01); *F16B 35/044* (2013.01); *B60G 2204/10* (2013.01); *B60G 2206/82* (2013.01)

(58) Field of Classification Search
CPC ...... F16B 31/021; F16B 35/04; F16B 35/041; F16B 35/044; F16B 41/005; B60G 9/02; B60G 2204/10; B60G 2206/82; B60G 2206/8207; B60G 2204/143; B60G 2200/31; B60G 7/02; B60G 9/006
See application file for complete search history.

(56) References Cited

U.S. PATENT DOCUMENTS

| | | | | |
|---|---|---|---|---|
| 4,502,825 | A * | 3/1985 | Yamada | ................. F16B 31/021 411/402 |
| 9,333,826 | B1 | 5/2016 | Saieg et al. | |
| 9,944,122 | B2 | 4/2018 | Schuck | |
| 10,017,021 | B2 | 7/2018 | Saieg et al. | |
| 2005/0001397 | A1* | 1/2005 | Genick, II | ............. F16B 35/041 280/86.754 |
| 2016/0059653 | A1* | 3/2016 | Gan | ....................... F16B 35/041 280/86.753 |

* cited by examiner

*Primary Examiner* — Jonathan Ng
*Assistant Examiner* — Daniel M. Keck
(74) *Attorney, Agent, or Firm* — Brooks Kushman PC (57) ABSTRACT

A shear bolt and an axle suspension system having a shear bolt. The shear bolt may have a shear head and an enlarged head. The shear head may be configured to detach from the shear bolt. The enlarged head may have first and second protrusions that may be grasped by a tool in a manner that prevents tightening of the shear bolt.

20 Claims, 6 Drawing Sheets

AXLE SUSPENSION SYSTEM HAVING A SHEAR BOLT

TECHNICAL FIELD

This disclosure relates to a shear bolt and an axle suspension system that includes the shear bolt.

BACKGROUND

An axle suspension system is disclosed in U.S. Pat. No. 9,333,826.

SUMMARY

In at least one embodiment, a shear bolt is provided. The shear bolt may include a shank, a shear head, and an enlarged head. The shank may extend along an axis. The shear head may extend along the axis and may be spaced apart from the shank. The shear head may be configured to sever from the shear bolt. The enlarged head may be axially positioned between the shank and the shear head. The enlarged head may include a first surface, a second surface, a first protrusion, and a second protrusion. The first surface may face toward the shear head. The second surface may face toward the shank. The first protrusion may extend from the first surface toward the second surface and may have a first tool engagement surface that extends from the first surface toward the second surface. The second protrusion may extend from the first surface toward the second surface. The second protrusion may have a second tool engagement surface that extends from the first surface toward the second surface. The second protrusion has the same configuration as the first protrusion. The first protrusion and the second protrusion may not have mirror symmetry with respect to a first center plane that is disposed perpendicular to the axis.

In at least one embodiment, an axle suspension system is provided. The axle suspension system may include a trailing arm, a hanger bracket, and a shear bolt. The shear bolt may pivotally couple the hanger bracket to the trailing arm. The shear bolt may include a shank, a shear head, and an enlarged head. The shank may extend along an axis. The shear head may extend along the axis and may be spaced apart from the shank. The shear head may be configured to sever from the shear bolt. The enlarged head may be axially positioned between the shank and the shear head. The enlarged head may include a first surface, a second surface, a first protrusion, and a second protrusion. The first surface may face away from the hanger bracket. The second surface may face toward the hanger bracket. The second surface may extend further from the axis than the first surface. The first protrusion may extend from the first surface toward the second surface and may have a first tool engagement surface that may extend from the first surface toward the second surface. The second protrusion may extend from the first surface toward the second surface. The second protrusion may have a second tool engagement surface that may extend from the first surface toward the second surface and may be disposed parallel to the first tool engagement surface. The first protrusion and the second protrusion may have rotational symmetry about the axis and may not have mirror symmetry.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
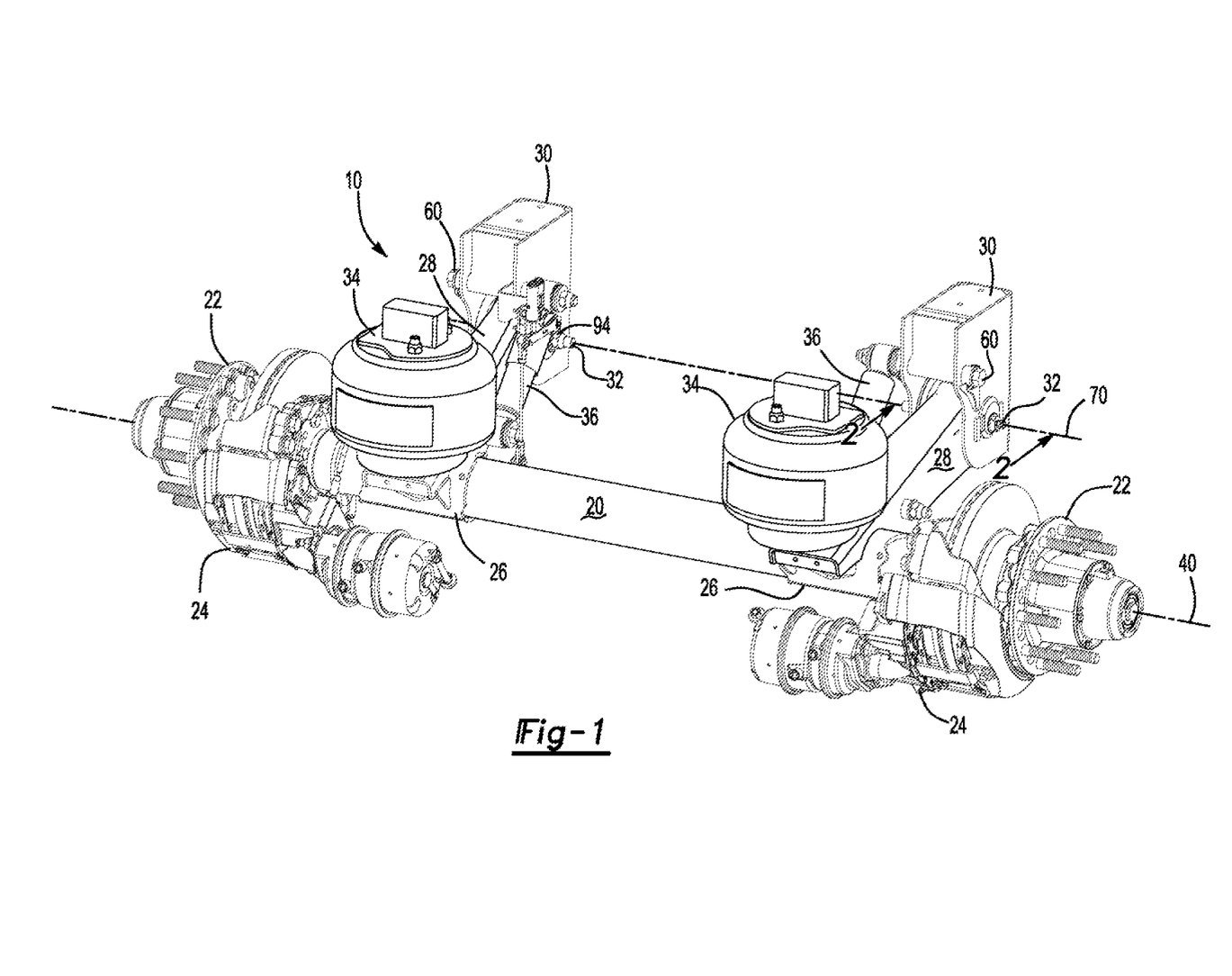
FIG. 1 is a perspective view of an example of an axle suspension system having a shear bolt.

Referring to FIG. 1, an example of an axle suspension system 10 is shown. The axle suspension system 10 may be provided with a vehicle, such as motor vehicle or a trailer that may be provided with a motor vehicle. The axle suspension system 10 may include an axle 20, a hub 22, a brake subsystem 24, an axle wrap 26, a trailing arm assembly 28, a hanger bracket 30, a shear bolt 32, an air spring 34, and a shock absorber 36. In FIG. 1, a hub 22, brake subsystem 24, axle wrap 26, trailing arm assembly 28, hanger bracket 30, shear bolt 32, air spring 34, and shock absorber 36 are provided in a cluster or grouping proximate each end of the axle 20.

The axle 20 may extend along an axle axis 40. The axle 20 may have a generally tubular or cylindrical configuration and may provide a structure that may support and facilitate mounting of other components of the axle suspension system 10.

The hub 22 may be rotatably disposed on the axle 20. The hub 22 may be rotatable about the axle axis 40 and may facilitate mounting of a wheel upon which a tire may be mounted. For example, the hub 22 may include a plurality of mounting studs that may extend through a wheel.

The brake subsystem 24 may be configured to brake or inhibit rotation of an associated hub 22. The brake subsystem 24 may be mounted to the axle 20 proximate an end of the axle 20. The brake subsystem 24 may be configured as a friction brake, such as a drum brake or a disc brake. In the configuration shown in FIG. 1, the brake subsystem 24 is configured as a disc brake and may include a rotor that may rotate with the hub 22 and a pair of brake pads that may be disposed on opposite sides of the rotor. The brake pads may be actuated into engagement with the rotor to provide a brake torque that may slow or stop rotation of an associated hub 22 in a manner known by those skilled in the art.

The axle wrap 26, if provided, may be fixedly disposed on the axle 20. The axle wrap 26 may extend at least partially around an exterior surface or outside circumference of the axle 20. The axle wrap 26 may be positioned between the axle 20 and an associated trailing arm assembly 28 and may facilitate mounting of the trailing arm assembly 28 to the axle 20.

Figure 2:
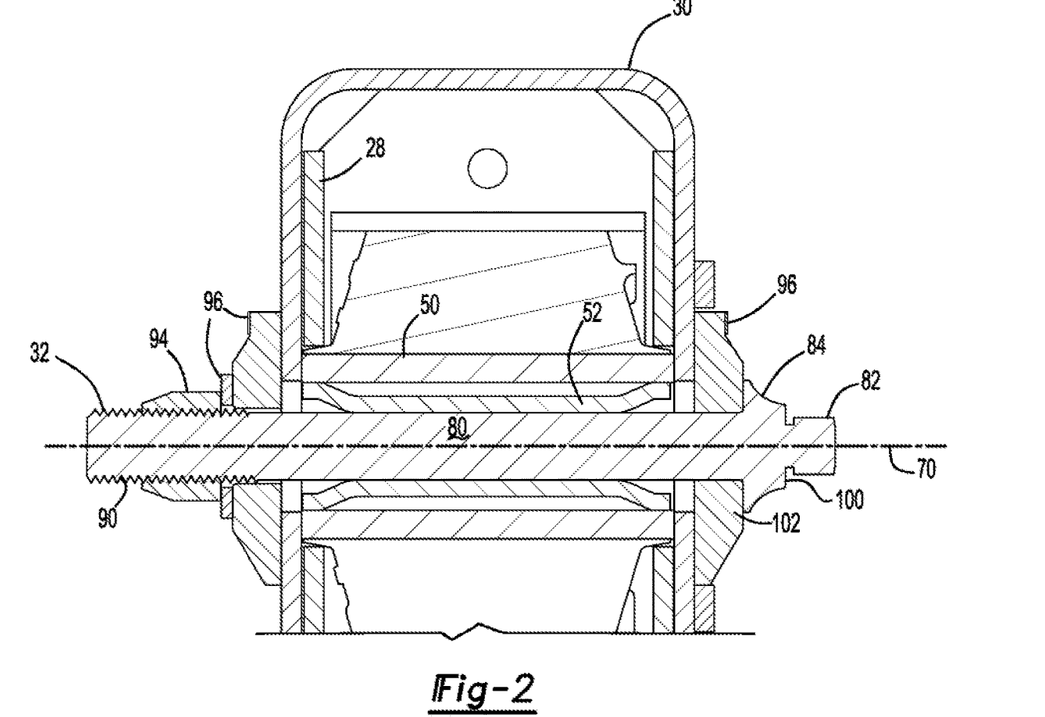
FIG. 2 is a section view of the axle suspension system along section line 2-2.

The trailing arm assembly 28 may be fixedly disposed on the axle wrap 26. For example, the trailing arm assembly 28 may be secured to the axle wrap 26 in any suitable manner, such as with a weld, fastener, interference fit, or combinations thereof. The trailing arm assembly 28 may extend away from the axle 20 and may be pivotally coupled to the hanger bracket 30 as will be discussed in more detail below. As is best shown in FIG. 2, the trailing arm assembly 28 may have a generally hollow construction and may include a sleeve 50. The sleeve 50 may extend through the trailing arm assembly 28 and may be configured to receive the shear bolt 32. The sleeve 50 may be configured as a hollow cylindrical tube. Optionally, an alignment tube 52 may be received inside the sleeve 50. The alignment tube 52 may receive the shear bolt 32 and may help position or align the shear bolt 32 with respect to the sleeve 50 and transmit load forces.

The hanger bracket 30 may facilitate mounting of the axle suspension system 10 to a frame or chassis of the vehicle. The hanger bracket 30 may be spaced apart from the axle 20 and may be pivotally mounted to the trailing arm assembly 28. For example, the hanger bracket 30 may have a generally hollow configuration and may receive an end of the trailing arm assembly 28. The hanger bracket 30 may include a pair of openings that may be disposed on opposite lateral sides of the hanger bracket 30. The openings may be aligned with the sleeve 50 and may receive the shear bolt 32. As is best shown in FIG. 1, the shock absorber 36 may be pivotally mounted to the hanger bracket 30, such as with a shock absorber mounting bolt 60.

Figure 3:
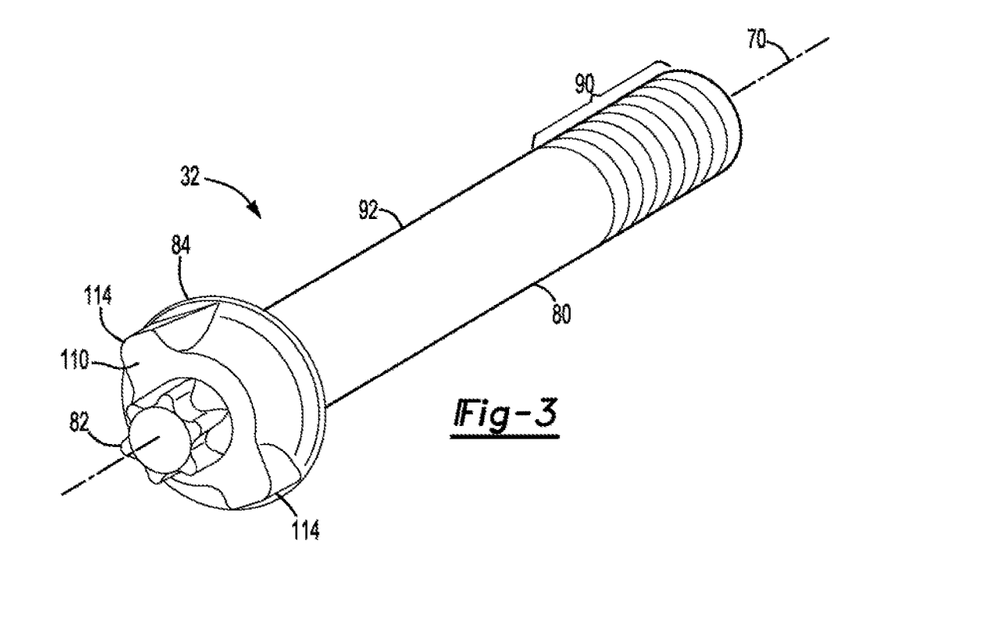
FIG. 3 is a perspective view of the shear bolt.

Referring to FIGS. 1-3, the shear bolt 32 may pivotally couple the trailing arm assembly 28 to the hanger bracket 30. As is best shown in FIG. 2, the shear bolt 32 may extend along an axis 70 and may extend through the trailing arm assembly 28 and the hanger bracket 30 such that opposing ends of the shear bolt 32 may protrude from the opposing lateral sides of the hanger bracket 30. As is best shown in FIG. 1, the axis 70 may extend substantially parallel to the axle axis 40.

An example of a shear bolt 32 is shown in isolation in FIGS. 3-6. In at least one configuration, the shear bolt 32 may include a shank 80, a shear head 82, and an enlarged head 84.

Referring to FIGS. 2 and 3, the shank 80 may extend along the axis 70. Moreover, the shank 80 may extend from the enlarged head 84 in a direction that extends away from the shear head 82. In at least one configuration and as is best shown in FIG. 3, the shank 80 may have a threaded portion 90 and a non-threaded portion 92.

The threaded portion 90 may extend from an end of the shank 80 that may be disposed opposite the shear head 82. As is best shown in FIG. 2, the threaded portion 90 may be at least partially disposed outside the hanger bracket 30 when the shear bolt 32 pivotally couples the trailing arm assembly 28 to the hanger bracket 30. The threaded portion 90 may have a thread that may mate with a corresponding thread on a nut 94. The nut 94 may receive the threaded portion 90 and may inhibit axial movement and removal of the shear bolt 32. Optionally, one or more washers 96 may receive the shank 80. For example, one or more washers 96 may be positioned between the nut 94 and the hanger bracket 30, between the enlarged head 84 and the hanger bracket 30, or both. It is also contemplated that the threaded portion 90 may extend to the enlarged head 84 such that the non-threaded portion 92 may be omitted.

The non-threaded portion 92, if provided, may extend from the enlarged head 84 to the threaded portion 90. The non-threaded portion 92 may be cylindrical and may extend into or completely through the trailing arm assembly 28, the hanger bracket 30, or both.

Figure 5:
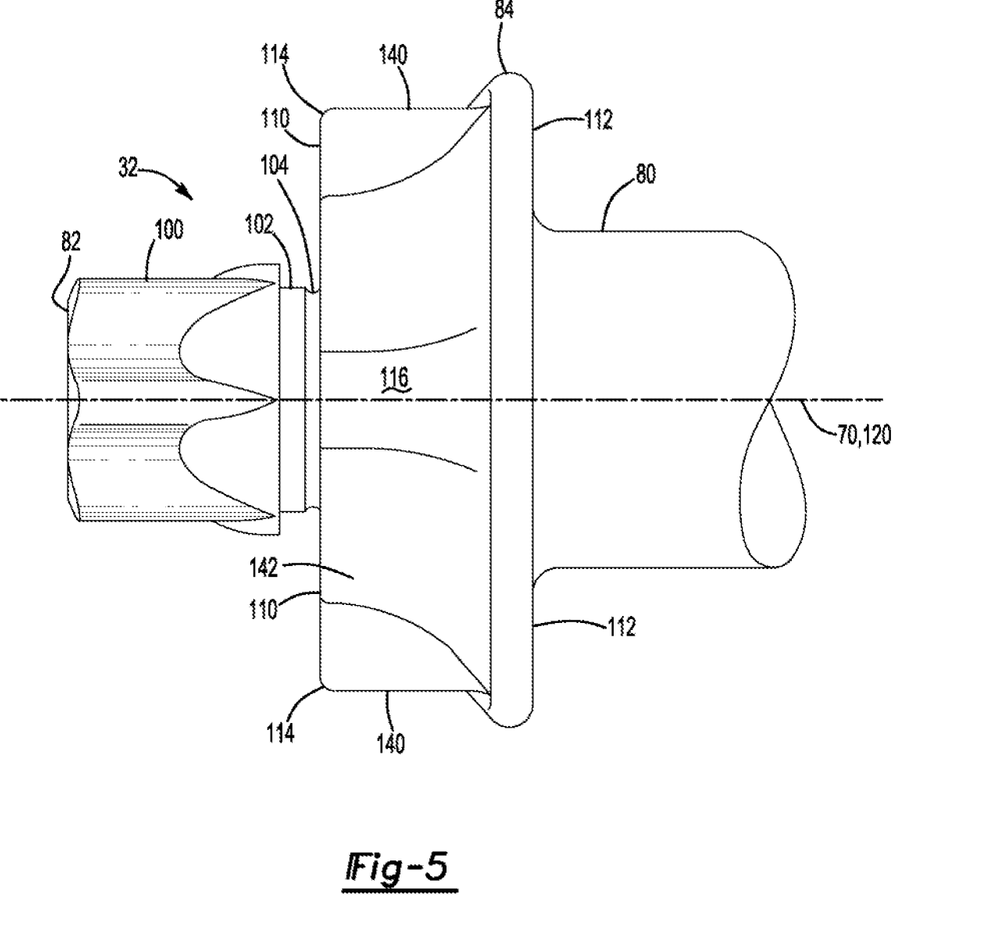
FIG. 5 is a side view of a portion of the shear bolt.

Referring to FIGS. 3 and 5, the shear head 82 may extend along the axis 70 and may be spaced apart from the shank 80. As is best shown in FIG. 5, the shear head 82 may include a tool engagement portion 100, a first neck 102, and a second neck 104.

The tool engagement portion 100 may be disposed at an end of the shear head 82 and may be spaced apart from the enlarged head 84. The tool engagement portion 100 may be configured to be engaged by or may be received in a tool, such as a socket or a wrench. The tool engagement portion 100 may have any suitable configuration that may be compatible with the tool. The figures depict the tool engagement portion 100 as a type of Torx head, such as an external Torx having a male configuration; however, it is contemplated that the tool engagement portion 100 may have a female configuration.

The first neck 102 may extend from the shear head 82 to the second neck 104. The first neck 102 may have a smaller diameter than the tool engagement portion 100.

The second neck 104 may extend from the first neck 102 to the enlarged head 84. The second neck may have a smaller diameter than the first neck 102 and may have a shorter axial length or length in a direction that extends along the axis 70 than the first neck 102. The second neck 104 may act as a force concentrator that may facilitate shearing or detachment of the shear head 82 from the shear bolt 32.

The shear head 82 may be configured to sever from or detach from the shear bolt 32 when sufficient torque is applied to the shear head 82. For example, the shear head 82 may be configured to sever at the second neck 104 and detach from the enlarged head 84 when sufficient torque is applied to the shear head 82 by a tool that rotates and tightens the shear bolt 32. More specifically, the shear bolt 32 may detach from the enlarged head 84 when the shear both 32 is inhibited from rotating about the axis 70 by the nut 94 and the amount of torque applied to the shear head 82 is sufficient to cause the shear head 82 to physically separate or twist off from the enlarged head 84. As a nonlimiting example, the shear head 82 may be configured to sever in response a torque of 500 foot pounds (678 Nm) or more. Accordingly, the shear head 82 may be sheared from the enlarged head 84 to prevent the shear bolt 32 from being overtightened, which may help prevent damage or deformation of components of the axle suspension system 10 that may impair rotation of the trailing arm assembly 28 with respect to the hanger bracket 30.

Referring to FIGS. 3-6, the enlarged head 84 may be axially positioned between the shank 80 and the shear head 82. The enlarged head 84 may extend further from the axis 70 than the shank 80 and the shear head 82. In at least one embodiment, the enlarged head 84 may include a first surface 110, a second surface 112, at least one protrusion 114, and at least one outer surface 116.

Figure 4:
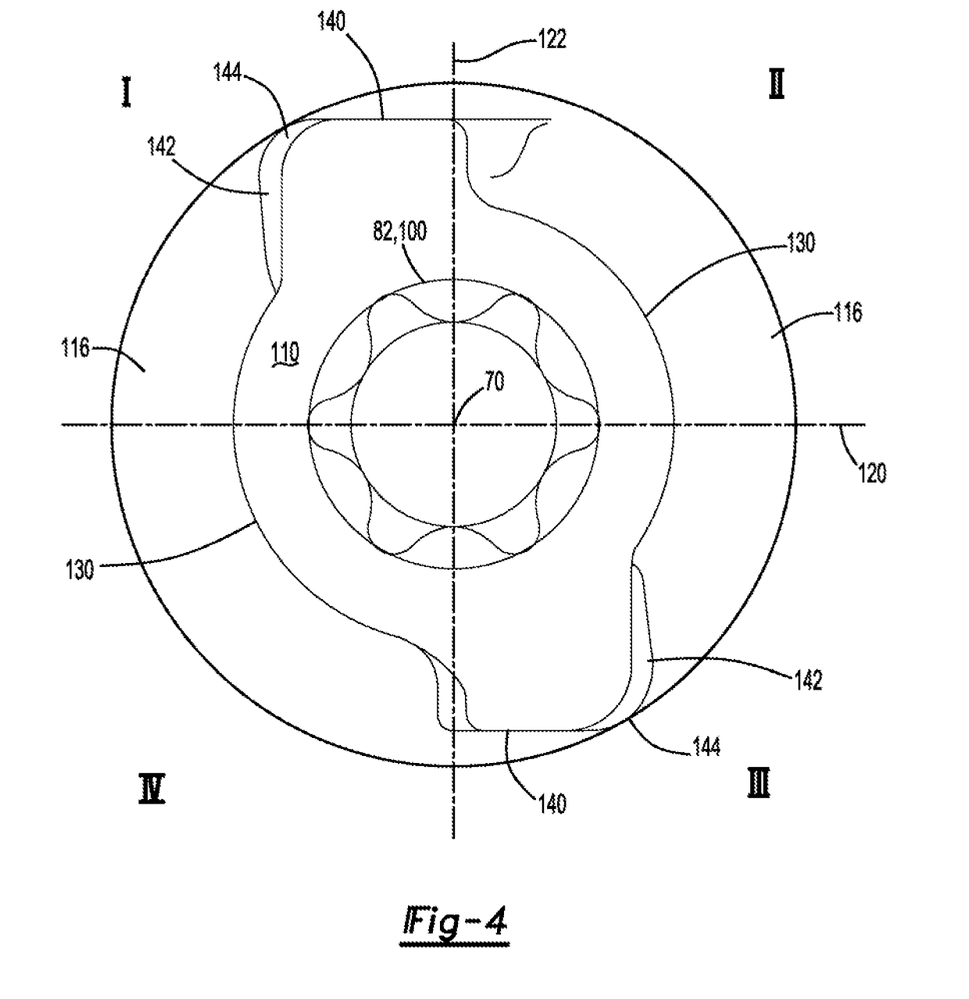
FIG. 4 is an end view of the shear bolt.

Referring to FIG. 4, multiple reference planes are shown to facilitate discussion of features of the enlarged head 84. These reference planes include a first center plane 120 and a second center plane 122. The first center plane 120 may be disposed perpendicular to the axis 70. The second center plane 122 may be disposed perpendicular to the first center plane 120. The first center plane 120 and the second center plane 122 may intersect at or along the axis 70. As such, the axis 70 may define the intersection of the first center plane 120 and the second center plane 122 such that the axis 70 may be completely disposed in the first center plane 120 and the second center plane 122.

The first center plane 120 and the second center plane 122 may divide the shear bolt 32 into four quadrants. These quadrants may be designated quadrants I, II, III, and IV, with quadrant I being located above the first center plane 120 and to the left of the second center plane 122 from the perspective shown in FIG. 4. The quadrants may be numbered in ascending order in a clockwise direction about the axis 70 from quadrant I. For convenience in reference, the protrusion 114 that is located in quadrant I may be referred to as a first protrusion and the protrusion 114 that is located in quadrant III may be referred to as a second protrusion. The first center plane 120 may be spaced apart from and may not intersect the protrusions 114. The second center plane 122 may intersect the protrusions 114 and may be disposed substantially perpendicular to a tool engagement surface 140 of a protrusion 114.

Referring to FIGS. 4 and 5, the first surface 110 may face toward the shear head 82. As such, the first surface 110 may face away from the hanger bracket 30 as is best shown in FIG. 2. In at least one configuration, the first surface 110 may extend from the second neck 104 in a direction that extends away from the axis 70 as is best shown in FIG. 5. The first surface 110 may be disposed substantially perpendicular to the axis 70 and may be substantially planar. As is best shown in FIG. 4, the first surface 110 may at least partially define one or more protrusions 114. Moreover, the first surface 110 may be have at least one arcuate edge 130.

An arcuate edge 130 may extend along an arc with respect to the axis 70. In at least one configuration, the arcuate edge 130 may be disposed at a constant or substantially constant radial distance from the axis 70. The arcuate edge 130 may be disposed further from the axis 70 than the shear head 82 and may be disposed closer to the axis 70 than an outer surface or largest outside diameter of the enlarged head 84. In the configuration shown in FIGS. 3-6, the enlarged head 84 may include a first arcuate edge 130 and a second arcuate edge 130. The first arcuate edge 130 may extend from a first protrusion 114 to a second protrusion 114 and is depicted in FIG. 4 as being located in quadrants I and IV. The second arcuate edge 130 may be disposed on an opposite side of the second center plane 122 from the first arcuate edge 130 and may extend from the second protrusion 114 to the first protrusion 114. As such, the first arcuate edge 130 may be spaced apart from the second arcuate edge 130 and may be located in quadrants II and III.

Referring to FIGS. 2 and 5, the second surface 112 may disposed opposite the first surface 110. As such, the second surface 112 may face toward the shank 80 and toward the hanger bracket 30. In at least one configuration, the second surface 112 may engage a washer 96 as is best shown in FIG. 2. As is best shown in FIG. 5, the second surface 112 may extend from the shank 80 in a direction that extends away from the axis 70. Moreover, the second surface 112 may extend further from the axis 70 than the first surface 110. The second surface 112 may be disposed substantially perpendicular to the axis 70 and may be substantially planar. As such, the first surface 110 may be disposed substantially parallel to the second surface 112 in one or more configurations.

Referring to FIGS. 4 and 5, the first protrusion 114 and the second protrusion 114 are shown. The first protrusion 114 and the second protrusion 114 may have the same configuration or substantially the same configuration in one or more embodiments. For brevity, features of a single protrusion will be described below and common reference numbers will be used to designate corresponding features of the first protrusion 114 and the second protrusion 114.

As is best shown in FIG. 4, the first protrusion 114 and the second protrusion 114 may have rotational symmetry but not mirror symmetry or reflection symmetry. For instance, the first protrusion 114 and the second protrusion 114 may have two-fold rotational symmetry about the axis 70 or symmetry when rotated about the axis 70 of an angle of 180° but may not have mirror symmetry with respect to a plane that is disposed perpendicular to the axis 70, such as the first center plane 120, second center plane 122, or other planes disposed between the first center plane 120 and the second center plane 122.

The protrusion 114 may extend from the first surface 110 toward the second surface 112. As is best shown in FIG. 5, the protrusion 114 may be spaced apart from the second surface 112. As is best shown with reference to FIGS. 4 and 6, the protrusion 114 may include a tool engagement surface 140 and an end surface 142.

Figure 6:
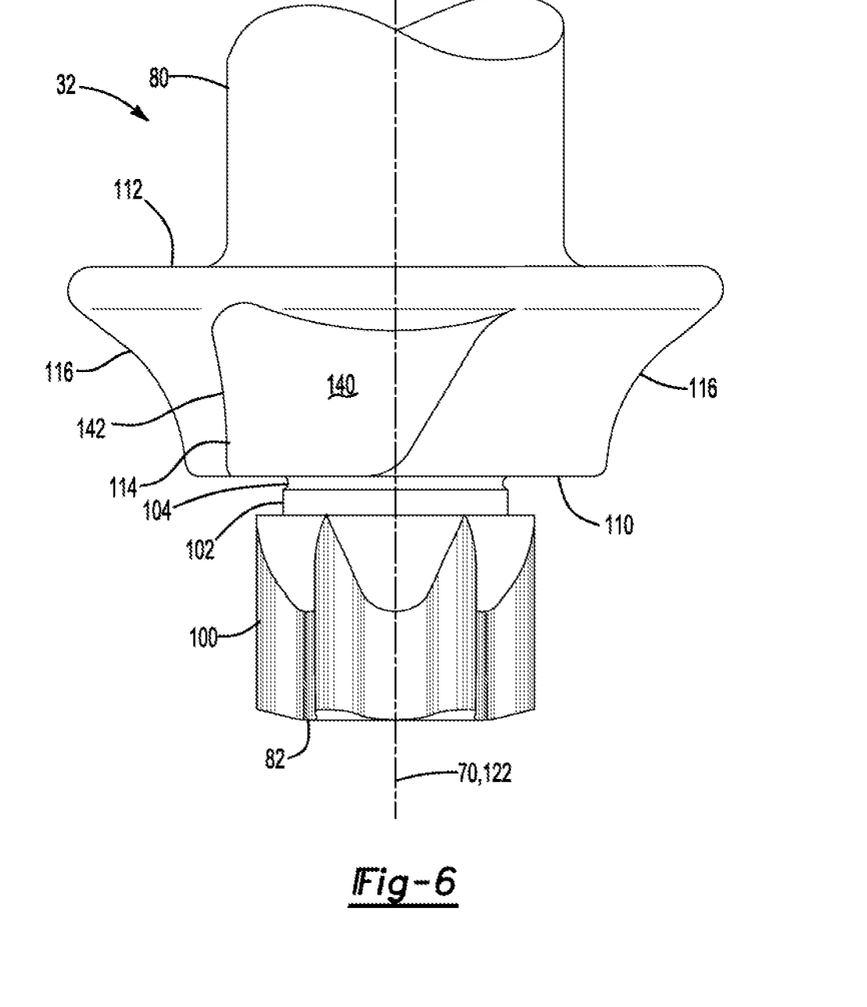
FIG. 6 is a top view of the portion of the shear bolt.

The tool engagement surface 140 may extend from an end or edge of the first surface 110 toward the second surface 112. In addition, the tool engagement surface 140 may he spaced apart from the arcuate edges 130 and may be disposed further from the axis 70 than the arcuate edges 130. The tool engagement surface 140 may extend substantially parallel to the axis 70 and the first center plane 120. For convenience in reference, the tool engagement surface 140 that may be provided with the first protrusion 114 may be referred to as a first tool engagement surface. The tool engagement surface 140 that may be provided with the second protrusion 114 may be referred to as a second tool engagement surface. The first tool engagement surface 140 may be disposed substantially parallel to the second tool engagement surface 140.

Referring to FIG. 4, the end surface 142 may extend from another end or edge of the first surface 110 toward the second surface 112. In addition, the end surface 142 may extend from an end of an arcuate edge 130 away from the axis 70 and toward the outer surface of the enlarged head 84. A curved portion 144 may be provided at an outermost point or region of the protrusion 114 that may be located furthest from the axis 70. The curved portion 144 may extend from the first surface 110 toward the second surface 112 and may extend from the end surface 142 to the tool engagement surface 140. As such, the protrusion 114 may be continuously curved from the tool engagement surface 140 to the end surface 142. The end surface 142 may be disposed closer to the axis 70 than the tool engagement surface 140. In addition, the end surface 142 may have a shorter length than the tool engagement surface 140 and may be disposed closer to the second center plane 122 than at least a portion of the arcuate edge 130.

As is best shown with reference to FIG. 6, the end surface 142 may be disposed at an angle with respect to the axis 70. As an example, the end surface 142 may be disposed at an angle of approximately 7°. For example, the end surface 142 may be disposed in a non-parallel and non-perpendicular relationship with the axis 70, second center plane 122, the tool engagement surface 140, or combinations thereof. The end surface 142 may be tapered such that the end surface 142 may extend progressively further from the second center plane 122 in an axial direction that may extend from the first surface 110 toward the second surface 112. As such, the end surface 142 of the first protrusion 114 may be disposed in a non-parallel relationship with the end surface 142 of the second protrusion 114.

Referring to FIG. 4, an outer surface 116 may extend from the first surface 110 toward the second surface 112. More specifically, an outer surface 116 may extend from an arcuate edge 130 of the first surface 110 toward the second surface 112 and away from the axis 70. An outer surface 116 may also extend at least partially around the axis 70 from a protrusion 114. For instance, in the configuration shown a first outer surface 116 extends from the first arcuate edge 130 toward the second surface 112 and from the end surface 142 of the first protrusion 114 to the second protrusion 114. A second outer surface 116 may extend from the second arcuate edge 130 toward the second surface 112 and from the end surface 142 of the second protrusion 114 to the first protrusion 114. The outer surface 116 may be a curved surface. For instance, the outer surface 116 may be curved in a rotational direction about the axis 70 and may be curved in a direction that may extend from the first surface 110 to the second surface 112. For instance, the outer surface 116 may be concave or convex from the first surface 110 to the second surface 112. A concave configuration, which is best shown in FIG. 6, may allow the enlarged head 84 to be provided with less material than a convex configuration. It is also contemplated that the outer surface 116 or a portion thereof may have a tapered conical configuration in one or more embodiments.

As is best shown in FIG. 4, the outer surface 116 may change its curvature along a side of the protrusion 114 that is disposed opposite the end surface 142. For instance, when viewed along the axis 70, the outer surface may be convex with respect to the axis 70 in quadrant I and IV from the first protrusion 114 to near where the second center plane 122 intersects the second protrusion 114 and then may become concave. The same configuration is shown in for the first protrusion 114 in quadrant II. The change in curvature may help prevent clockwise rotation of the shear bolt 32 with an open end wrench as will be discussed in more detail below.

The tapering of the end surface 142, the curved portion 144, and the positioning of the end surface 142 closer to the axis 70 than at least a portion of the arcuate edge 130 may inhibit or prevent the end surfaces 142 of the protrusions 114 from mating with a tool, such as a non-adjustable open end wrench. As such, the shear bolt 32 may not be tightened or loosened by trying to grasp the end surfaces 142 as the shear bolt 32 will slip and rotate within the opening of the wrench.

Figure 7:
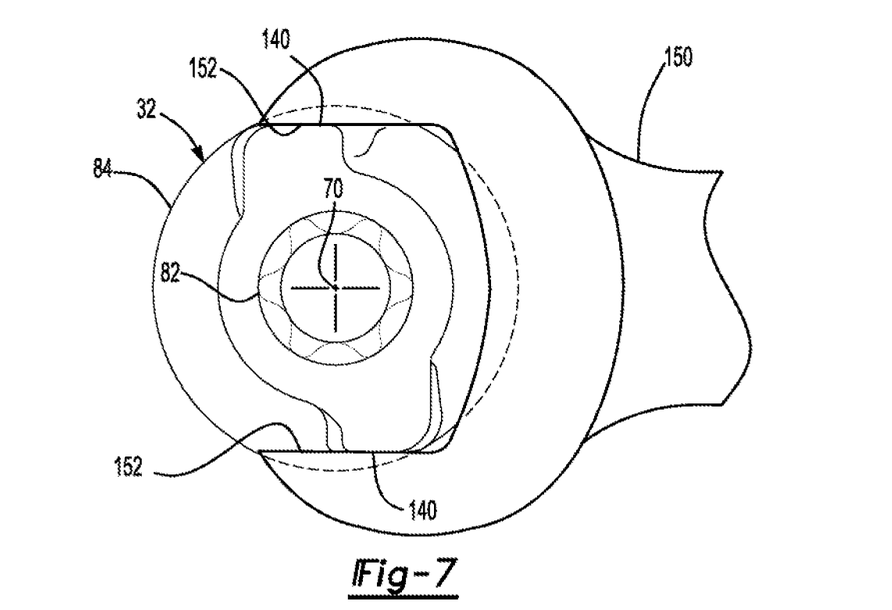
FIG. 7 is an end view of the shear bolt with protrusions of the shear bolt received by open end wrench.
Figure 8:
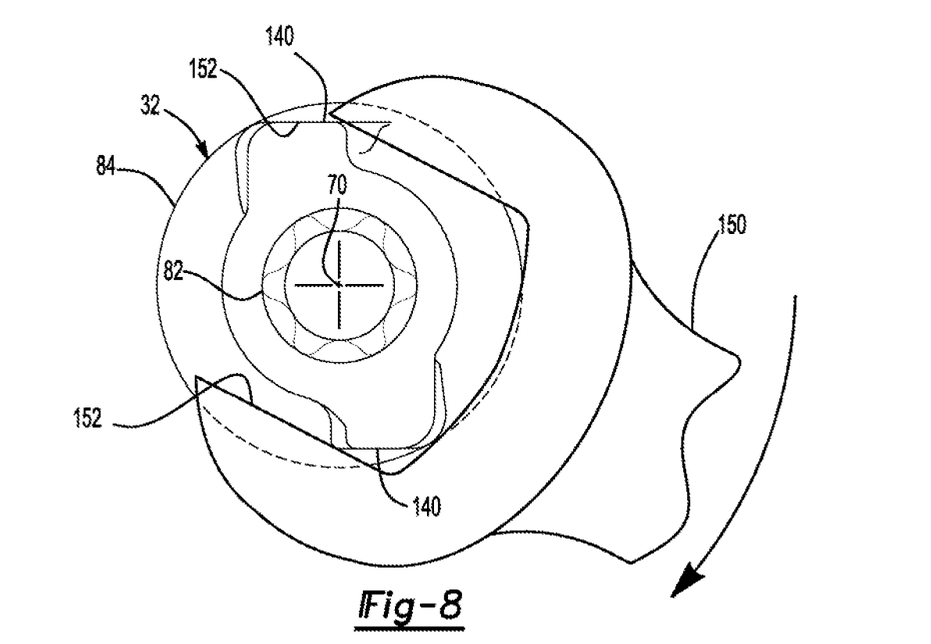
FIG. 8 is an end view of the shear bolt illustrating the open end wrench rotated clockwise and slid off the protrusions.

Referring to FIGS. 7 and 8, the protrusions 114 may be configured such that the tool engagement surfaces 140 may allow an open end wrench 150 or nonadjustable open end wrench to loosen but not tighten the shear bolt 32. From the perspective shown in FIGS. 7 and 8, the shear bolt 32 may be loosened by rotating the open end wrench 150 in a counterclockwise direction about the axis 70 and may be tightened by rotating the open end wrench 150 in a clockwise direction. The flats 152 of the open end wrench 150 may engage the tool engagement surfaces 140 of the first protrusion 114 and the second protrusion 114 as shown in FIG. 7. The flats 152 of the open end wrench 150 may remain in engagement with the tool engagement surfaces 140 when the open end wrench 150 is rotated about the axis 70 in a counterclockwise direction. However, as shown in FIG. 8, the flats 152 of the open end wrench 150 may slip off of the tool engagement surfaces 140 and may not rotate the shear bolt 32 when the open end wrench 150 is rotated about the axis 70 in a counterclockwise direction due to the positioning of the protrusions 114 and the manner in which the outer surfaces 116 extend to the protrusions 114 that allows the flats 152 to slide off of the protrusions 114 and not hold onto the enlarged head 84. Accordingly, the shear bolt 32 may be configured such that the shear bolt 32 may not be further tightened with an open end wrench 150 once the shear head 82 has been severed from the shear bolt 32.

Referring to FIG. 1, the air spring 34 may he mounted to the trailing arm assembly 28. For example, the air spring 34 may be disposed proximate an end of the trailing arm assembly 28 that may be disposed opposite the hanger bracket 30. In addition, the air spring 34 may be generally located above the axle 20. The air spring 34 may extend from the trailing arm assembly 28 to a frame or chassis of the vehicle and may be configured to dampen vibrations associated with vehicle travel, provide a desired level of ride quality, control vehicle ride height, or combinations thereof.

The shock absorber 36 may be provided to dampen impulses and to dissipate kinetic energy transmitted to the axle suspension system 10. The shock absorber 36 may be pivotally mounted to the hanger bracket 30 at a first end and may be pivotally mounted to the trailing arm assembly 28 at a second end.

While exemplary embodiments are described above, it is not intend that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A shear bolt comprising:
   a shank that extends along an axis;
   a shear head that extends along the axis and is spaced apart from the shank, wherein the shear head is configured to sever from the shear bolt; and
   an enlarged head that is axially positioned between the shank and the shear head, the enlarged bead including:
   a first surface that faces toward the shear head;
   a second surface that faces toward from the shank;
   a first protrusion that extends from the first surface toward the second surface and that has a first tool engagement surface that extends from the first surface toward the second surface; and
   a second protrusion that extends from the first surface toward the second surface and that has a second tool engagement surface that extends from the first surface toward the second surface, wherein the second protrusion has the same configuration as the first protrusion and the first protrusion and the second protrusion do not have mirror symmetry with respect to a first center plane that is disposed perpendicular to the axis.

2. The shear bolt of claim 1 wherein the second surface is disposed opposite the first surface, extends from the shank, and extends further from the axis than the first surface.

3. The shear bolt of claim 1 wherein the first surface is substantially planar and is disposed substantially parallel to the second surface.

4. The shear bolt of claim 1 wherein the first protrusion and the second protrusion are spaced apart from the second surface.

5. The shear bolt of claim 1 wherein the first tool engagement surface of the first protrusion is disposed substantially parallel to the second tool engagement surface of the second protrusion.

6. The shear bolt of claim 5 wherein the first tool engagement surface and the second tool engagement surface are disposed parallel to the first center plane and the axis.

7. The shear bolt of claim 1 further comprising a first outer surface that extends from the first surface toward the second surface.

8. The shear bolt of claim 7 wherein the first outer surface is concave.

9. The shear bolt of claim 7 wherein the first surface has a first arcuate edge that extends from the first protrusion to the second protrusion and a second arcuate edge that is spaced apart from the first arcuate edge and extends from the second protrusion to the first protrusion.

10. The shear bolt of claim 9 wherein the first arcuate edge and the second arcuate edge are disposed at a constant radial distance from the axis.

11. The shear bolt of claim 9 wherein the first outer surface extends from the first arcuate edge toward the second surface and a second outer surface extends from the second arcuate edge toward the second surface.

12. The shear bolt of claim 9 wherein the first protrusion has an end surface that extends from the first surface toward the second surface, wherein the end surface is disposed in a non-parallel and non-perpendicular relationship with the first tool engagement surface, the first center plane, and the axis.

13. The shear bolt of claim 12 wherein the end surface extends from an end of the first arcuate edge and the first outer surface.

14. The shear bolt of claim 13 further comprising a second center plane that is disposed perpendicular to the first center plane, wherein the first center plane and the second center plane intersect along the axis and the end surface of the first protrusion extends progressively further from the second center plane in a direction that extends from the first surface toward the second surface.

15. The shear bolt of claim 14 wherein the second protrusion has an end surface that extends from the first surface toward the second surface, wherein the end surface of the first protrusion is disposed in a non-parallel relationship with the end surface of the second protrusion.

16. The shear bolt of claim 15 wherein the end surface of the second protrusion extends progressively further from the second center plane in the direction that extends from the first surface toward the second surface.

17. The shear bolt of claim 12 wherein the first protrusion is continuously curved from the first tool engagement surface to the end surface of the first protrusion.

18. An axle suspension system comprising:
a trailing arm assembly;
a hanger bracket; and
a shear bolt that pivotally couples the hanger bracket to the trailing arm assembly, the shear bolt including:
a shank that extends along an axis;
a shear head that extends along the axis and is spaced apart from the shank, wherein the shear head is configured to sever from the shear bolt; and
an enlarged head that is axially positioned between the shank and the shear head, the enlarged head including:
a first surface that faces away from the hanger bracket;
a second surface that faces toward the hanger bracket, wherein the second surface extends further from the axis than the first surface;
a first protrusion that extends from the first surface toward the second surface and that has a first tool engagement surface that extends from the first surface toward the second surface; and
a second protrusion that extends from the first surface toward the second surface and that has a second tool engagement surface that extends from the first surface toward the second surface and is disposed parallel to the first tool engagement surface, wherein the first protrusion and the second protrusion have rotational symmetry about the axis and do not have mirror symmetry.

19. The axle suspension system of claim 18 wherein the enlarged head extends further from the axis than the shank and the shear head.

20. The axle suspension system of claim 18 wherein the trailing arm assembly has a sleeve, the shear bolt extends through the sleeve, the shank has a threaded portion that is at least partially disposed outside the hanger bracket, and a nut receives the threaded portion.

* * * * *

UNITED STATES PATENT AND TRADEMARK OFFICE
CERTIFICATE OF CORRECTION

PATENT NO. : 11,221,036 B2
APPLICATION NO. : 16/427800
DATED : January 11, 2022
INVENTOR(S) : Holt et al.

It is certified that error appears in the above-identified patent and that said Letters Patent is hereby corrected as shown below:

In the Claims

Column 8, Line 31, Claim 1:
After "the enlarged"
Delete "bead" and
Insert --head--.

Column 8, Line 33, Claim 1:
After "a second surface that faces toward"
Delete "from".

Signed and Sealed this
Tenth Day of May, 2022

Katherine Kelly Vidal
*Director of the United States Patent and Trademark Office*